US009228588B2

(12) United States Patent
Maier et al.

(10) Patent No.: US 9,228,588 B2
(45) Date of Patent: Jan. 5, 2016

(54) TURBOMACHINE COMPONENT TEMPERATURE CONTROL

(71) Applicants: William C. Maier, Almond, NY (US); Patrice LeConte, Sainte Adresse (FR); George M. Lucas, Hammondsport, NY (US)

(72) Inventors: William C. Maier, Almond, NY (US); Patrice LeConte, Sainte Adresse (FR); George M. Lucas, Hammondsport, NY (US)

(73) Assignee: Dresser-Rand Company, Olean, NY (US)

( * ) Notice: Subject to any disclaimer, the term of this patent is extended or adjusted under 35 U.S.C. 154(b) by 436 days.

(21) Appl. No.: 13/680,966

(22) Filed: Nov. 19, 2012

(65) Prior Publication Data

US 2013/0177389 A1        Jul. 11, 2013

Related U.S. Application Data

(60) Provisional application No. 61/583,737, filed on Jan. 6, 2012.

(51) Int. Cl.
| | |
|---|---|
| *F01D 25/14* | (2006.01) |
| *F04D 3/00* | (2006.01) |
| *F01D 25/26* | (2006.01) |
| *F01D 11/02* | (2006.01) |
| *F01K 7/18* | (2006.01) |
| *F02C 6/10* | (2006.01) |
| *F01D 11/10* | (2006.01) |
| *F01K 3/00* | (2006.01) |
| *F01K 7/32* | (2006.01) |

(52) U.S. Cl.
CPC .... *F04D 3/00* (2013.01); *F01D 11/02* (2013.01); *F01D 11/10* (2013.01); *F01D 25/14* (2013.01); *F01D 25/26* (2013.01); *F01K 3/004* (2013.01); *F01K 7/18* (2013.01); *F01K 7/32* (2013.01); *F02C 6/10* (2013.01)

(58) Field of Classification Search
CPC ....... F01D 11/02; F01D 17/105; F01D 25/14; F01D 25/26; F05D 2260/606; F01K 7/18; F01K 25/103
USPC .................................................. 415/115, 116
See application file for complete search history.

(56) References Cited

U.S. PATENT DOCUMENTS

| | | | | | |
|---|---|---|---|---|---|
| 2,467,818 | A | * | 4/1949 | Elston | 415/108 |
| 2,796,231 | A | * | 6/1957 | Hertl | 415/108 |
| 7,003,956 | B2 | * | 2/2006 | Yamashita et al. | 60/646 |
| 7,484,926 | B2 | * | 2/2009 | Suga et al. | 415/108 |
| 8,727,705 | B2 | * | 5/2014 | Inomata et al. | 415/117 |

* cited by examiner

*Primary Examiner* — Ninh H Nguyen
(74) *Attorney, Agent, or Firm* — Edmonds & Nolte, PC

(57) ABSTRACT

Apparatus and methods for expanding a process fluid are disclosed. The apparatus includes a casing having an inlet and an outlet, and a component carrier disposed in the casing. The component carrier and the casing defining a cavity therebetween, and the component carrier at least partially defines a process flowpath fluidly communicating with the inlet and the outlet of the casing. The apparatus also includes a rotor disposed at least partially in the component carrier, with the rotor at least partially defining a first expansion stage intersecting the process flowpath. The apparatus also includes a bleed port extending from the process flowpath at a first point of the process flowpath to the cavity, to provide a thermal buffer fluid to the cavity.

18 Claims, 3 Drawing Sheets

TURBOMACHINE COMPONENT TEMPERATURE CONTROL

The present application claims priority to U.S. Application No. 61/583,737 filed Jan. 6, 2012. The priority application is hereby incorporated by reference in its entirety into the present application.

BACKGROUND

Heat engines are used to convert thermal energy into useful mechanical work and are often used in power generation plants. One common example of a heat engine is an expander-generator system, which generally includes an expander (e.g., a turbine) rotatably coupled to a generator or other power generating device. As process fluids are expanded in the expander, the shaft connecting the turbine and generator rotates and generates electricity in the generator.

Many power plant expander-generators are based on the Rankine cycle and obtain high-temperature, high-pressure process fluids to expand by pumping a fluid in a pump and evaporating and heating the fluid via combustion of coal, natural gas, oil, and/or nuclear fission. Common fluids for such engines include water and air. Recently, however, due to perceived benefits in terms of hardware compactness, efficiency, heat transfer characteristics, etc., there has been considerable interest in using super-critical carbon dioxide ($ScCO_2$) as a process fluid for certain expander-generator applications. Notable among such applications are nuclear, solar, and waste heat energy conversion cycles. A challenge to implementing practical waste heat recovery systems using $ScCO_2$ is that such systems often create a problematic combination of relatively high-pressure and high-temperature process fluids that are difficult to effectively contain.

One common solution to handle the high-pressure, high-temperature fluids is installing the expander flowpath components in an un-split barrel casing. In a typical barrel casing configuration, the internal components are aligned with each other, both axially and radially, by concentric circumferential fits against the inner surface of the barrel casing. This solution is effective for high-pressure applications, but generally only at modest temperatures (e.g., below 600° F.). In higher-temperature applications, the use of such casings can still allow temperature-sensitive components of the machines to be exposed to temperatures above their safe operating ranges for extended periods of time, which can lead to component failure. For example, dry gas seals, elastomeric seals, and carbon ring seals may be capable of withstanding the pressures in the machine, but may be ill-suited for such high temperatures.

What is needed, therefore, is an apparatus and method for controlling temperatures in high-temperature during expansion while maintaining efficient sealing and precise alignment.

SUMMARY

Embodiments of the disclosure may provide an exemplary apparatus for expanding a process fluid. The apparatus includes a casing having an inlet and an outlet, and a component carrier disposed in the casing. The component carrier and the casing defining a cavity therebetween, with the component carrier at least partially defining a process flowpath fluidly communicating with the inlet and the outlet of the casing. The apparatus also includes a rotor disposed at least partially in the component carrier, with the rotor at least partially defining a first expansion stage intersecting the process flowpath. The apparatus also includes a bleed port extending from the process flowpath at a first point of the process flowpath to the cavity, to provide a thermal buffer fluid to the cavity.

Embodiments of the disclosure may further provide an exemplary rotating machine. The rotating machine includes a casing having a higher-temperature inlet, a higher-temperature outlet, a lower-temperature inlet, and a lower-temperature outlet. The rotating machine also includes a lower-temperature component carrier disposed in the casing. The lower-temperature component carrier includes a first expansion stage and defines a first process flowpath intersecting the first expansion stage. The first process flowpath is fluidly coupled to the lower-temperature inlet and the lower-temperature outlet. The lower temperature component carrier and the casing define a first cavity radially therebetween. The rotating machine also includes a higher-temperature component carrier disposed in the casing and co-axially aligned with the lower-temperature component carrier. The higher-temperature component carrier includes a second expansion stage and defining a second process flowpath intersecting the second expansion stage. The second process flowpath is fluidly coupled to the higher-temperature inlet and the higher-temperature outlet. The higher temperature component carrier and the casing defining a second cavity radially therebetween, with the second cavity being in fluid communication with the first cavity. The rotating machine also includes a bleed port extending in the lower-temperature component carrier and fluidly communicating with the first process flowpath at a first point of the first process flowpath and with the first cavity, to provide a thermal barrier fluid from the first process flowpath to the second cavity.

Embodiments of the disclosure may also provide an exemplary method for controlling temperature in a rotating machine. The method includes expanding a process fluid in a lower-temperature component carrier and a higher-temperature component carrier, and bleeding a thermal barrier fluid from a process flowpath of the lower-temperature component carrier. The method also includes introducing the thermal barrier fluid to a first cavity defined between the lower-temperature component carrier and a casing of the rotating machine such that heat transfers from the lower-temperature component carrier, the higher temperature component carrier, or both to the thermal barrier fluid, and returning at least a portion of the thermal barrier fluid to the process flowpath via a return port defined in the lower-temperature component carrier.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
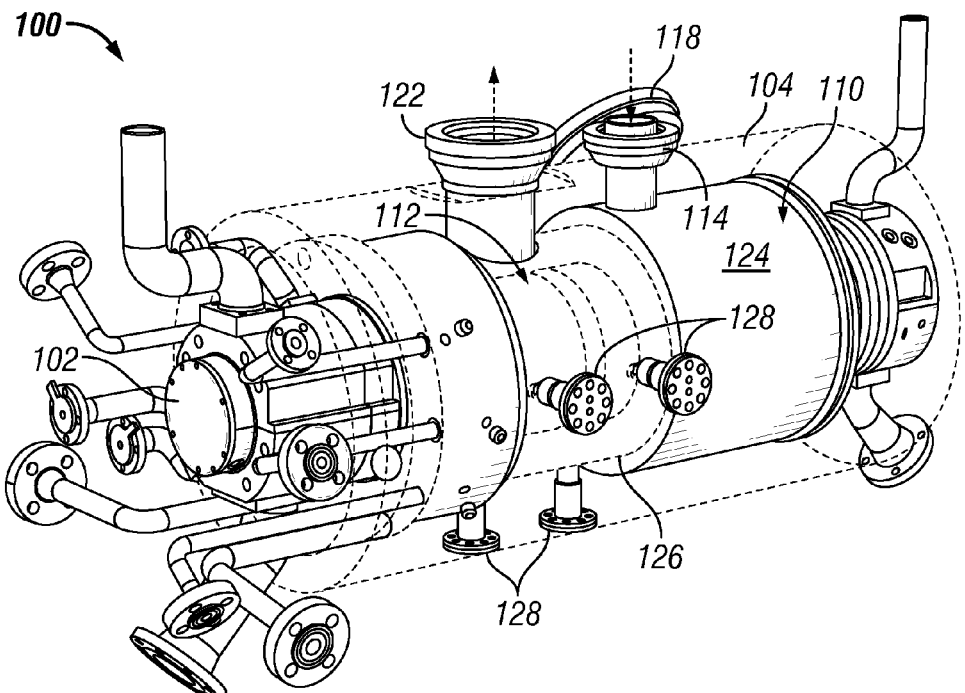
FIG. 1 illustrates an isometric view of an exemplary rotating machine, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
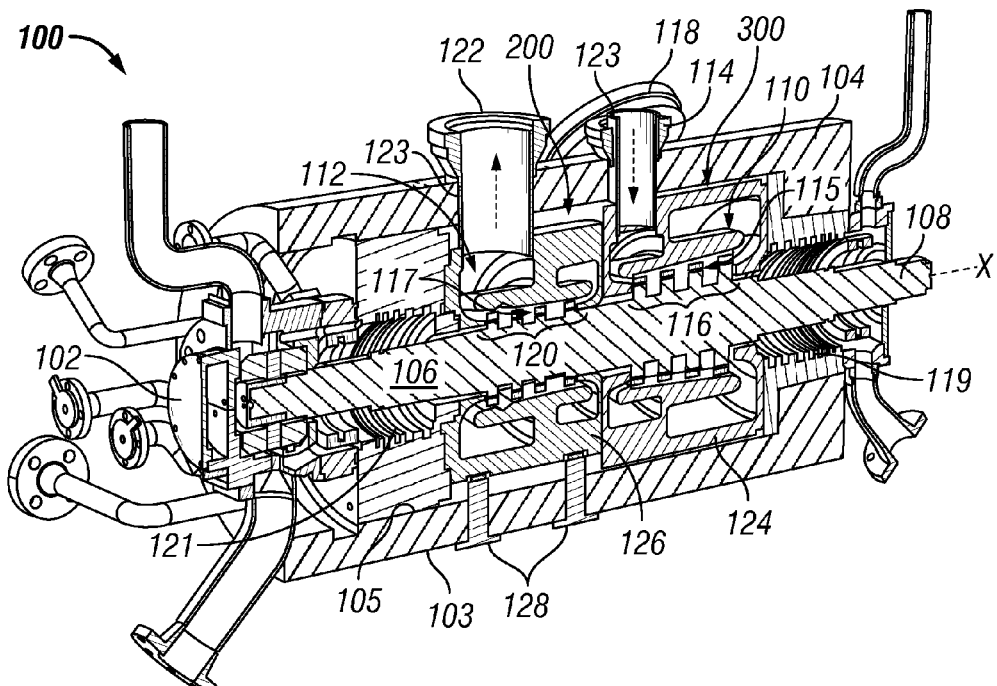
FIG. 2 illustrates a cross-sectional view of the rotating machine of FIG. 1, according to an embodiment.

FIGS. 1 and 2 illustrate an isometric view and a cross-sectional view, respectively, of an exemplary rotating machine 100, according to an embodiment. The rotating machine 100 includes an expander 102 arranged within a barrel casing 104. The barrel casing 104 is depicted in phantom in FIG. 1 to provide illustration of the internal components. The barrel casing 104 may be fabricated of various alloys of steel, stainless steel, or the like to provide support and pressure containment for the structures disposed therein. In other embodiments of the rotating machine 100, the expander 102 may be replaced with or combined with any other type of rotating machinery, such as a compressor, blower, pump, fan, any combination thereof, or the like.

The barrel casing 104 may be an un-split, cylindrical, pressure-containing vessel having an outer circumferential surface 103 and an inner circumferential surface 105. The barrel casing 104 receives the expander 102 therein in a sleeve-and-insert combination such that the expander 102 is generally arranged adjacent the inner circumferential surface 105. In other embodiments, however, the barrel casing 104 may be split horizontally for ease of access to the internal components, or may be otherwise configured as desired.

A shaft 106 extends substantially from one end of the barrel casing 104 to the other and rotates about a central axis X. A free end 108 of the shaft 106 may penetrate the barrel casing 104 at an axial end thereof in order to be operatively coupled to a load-receiving device (not shown) that converts the rotational energy of the shaft 106 into useful work. The load-receiving device may include a pump, mill, compressor, blower, fan, generator, gearbox, any combination thereof, or the like.

The expander 102 may be configured to extract energy from a high-pressure, high-temperature process fluid and convert that energy into rotation of the shaft 106. As illustrated, the expander 102 may be a four-stage, two-flow, axial-flow expander, having a first or higher-temperature internal expansion component 110 arranged axially-adjacent a second or lower-temperature internal expansion component 112. In other embodiments, the expander 102 may be any other type of expansion device configured to extract energy from a process fluid. For example, the expander 102 may be a radial-flow expander, may include only a single internal expansion component, or may otherwise include different expander stage counts, different numbers of process fluid flows, etc., without departing from the scope of the disclosure.

The term "process fluid" is not intended to limit the state or phase of referenced flow stream. Rather, the process fluid may be in a gas phase, a super-critical state, a sub-critical state, combinations thereof, or any other phase or state. Further, the process fluid may include solid particles and liquids, although these may generally be sought to be removed. In one embodiment, the process fluid is water (e.g., steam) or air. In other embodiments, the process fluid is carbon dioxide ($CO_2$), such as super-critical carbon dioxide ($ScCO_2$). The term "carbon dioxide" is not intended to be limited to a $CO_2$ of any particular type, purity, or grade. For example, industrial grade $CO_2$ may be used as the process fluid. "Substantially $CO_2$" is defined herein as more than about 50% $CO_2$ by volume.

A first or higher-temperature inlet 114 is defined in the barrel casing 104 and fluidly communicates process fluid to the first internal expansion component 110 and into a process flowpath 115 defined therein. In one example, the first inlet 114 may receive a process fluid, such as $ScCO_2$ at a temperature of between about 600° F. and about 1000° F. A first set of expansion stages 116 intersects the process flowpath 115 and expands the process fluid to transfer energy stored in the process fluid to rotate the shaft 106. The process flowpath 115 is fluidly connected to and terminates with a first or higher-temperature outlet 118, where the process fluid from the process flowpath 115 is discharged. A second or lower temperature inlet 202 (see FIG. 3, described below) is also defined in the barrel casing 104 and fluidly communicates process fluid to a process flowpath 117 defined in the second internal expansion component 112. The process flowpath 117 intersects a second set of expansion stages 120, which expand the process fluid, converting pressure into shaft 106 rotation. The process flowpath 117 is fluidly connected to and terminates with a second or lower-temperature outlet 122, through which process fluid from the process flowpath 117 is discharged. Accordingly, the process fluid flows in each internal expansion component 110, 112 and proceeds in opposite axial directions toward the axial extents of the expander 102.

Embodiments contemplated herein, however, also include other flow path configurations, such as single flowpath configurations where only a single flow of process fluid is expanded in a single or multiple axial directions.

Each inlet 114, 202 (FIG. 3) and outlet 118, 122 of the rotating machine 100 may include a transfer conduit or tube 123 adapted to transfer the process fluid to and from the first and second process flowpaths 115, 117, defined in the first and second internal expansion components 110, 112, respectively. Each transfer tube 123 forms a sealed connection with the corresponding internal expansion components 110, 112. The transfer tubes 123 also form a sealed conduit through the barrel casing 104, which accommodates the inlet 114, 202 (FIG. 3) and outlet 118, 122 or some portion thereof. This sealing may be accomplished, for example, with piston rings at each end of the transfer tube 123. Moreover, the ends of each transfer tube 123 may be radiused in a "dog-bone" shape to allow a small amount of movement and to facilitate easy assembly. Additionally, outboard of the internal expansion components 110, 112, proximal each axial extent of the barrel casing 104, the rotating machine 100 may include one or more dry gas seals (not shown), which may receive a conditioned gas, as known in the art. The dry gas seals may be disposed in dry gas seal cavities 119, 121, and may prevent migration of process gas out of the barrel casing 104.

The individual expansion stages 116, 120 of the first and second internal expansion components 110, 112 each generally include an array of stator vanes mounted in an annular pressure-containing diaphragm and followed axially by an array of rotating blades mounted on the outer radial extent of a disk-shaped wheel. The wheel is, in turn, mounted on the shaft 106 for rotation, and may be integrally-formed therewith in at least one embodiment. The pressure-containing diaphragm of the first internal expansion component 110 is mounted in a first or higher-temperature component carrier 124, and the pressure-containing diaphragm of the second or lower-temperature internal expansion component 112 is mounted in a second or lower-temperature component carrier 126. Each component carrier 124, 126 is generally annular and mounted co-axially within the barrel casing 104 adjacent the inner circumferential surface 105 thereof such that the component carriers 124, 126 are aligned both axially and radially with respect to the central axis X. Such alignment may be adjusted via a plurality of radially-oriented carrier alignment fixtures 128. Examples of such fixtures 128 are described in greater detail in U.S. Patent Application Ser. No. 61/583,729, which is incorporated herein by reference to the extent consistent with the present disclosure.

Furthermore, one or both of the component carriers 126, 124 may be spaced radially apart from the inner circumferential surface 105 of the barrel casing 104, thus defining thermal cavities 200, 300 therebetween, respectively. One, some, or all of the inlets 114, 202 (FIG. 3) and outlets 118, 122 may be at least partially disposed in at least one of the thermal barrier cavities 200, 300. As such, the thermal cavities 200, 300 may be generally annular, occupying the area between the cylindrical component carriers 124, 126 and the inner circumferential surface 105 of the barrel casing 104. However, in some embodiments, the thermal cavities 200, 300 may have different shapes, as desired. Further, the first internal expansion component 110 may be larger in radius than the second internal expansion component 112. In embodiments in which the barrel casing 104 has a generally constant internal diameter, as shown, the thermal barrier cavity 300 may be of a reduced width as compared to the thermal barrier cavity 200. Additionally, embodiments are contemplated herein where the thermal barrier cavities 200, 300 are continuous or connected by conduits, pipes, etc. such that the thermal barrier cavities 200, 300 are in fluid communication with one another.

The thermal barrier cavities 200, 300 may be in fluid communication with at least one of the process flowpaths 115, 117. For example, the thermal barrier cavity 200 may be in fluid communication with the process flowpath 117 of the second internal expansion component 112, so as to receive or "bleed" thermal barrier fluid therefrom. The thermal barrier fluid may then be circulated through the thermal barrier cavities 200, 300 such that it may interact with one or more of the transfer tubes 123 of the inlets 114, 202 and/or the outlets 118, 122, and/or with the radially-outer extents of the component carriers 124, 126 to transfer heat therefrom. Accordingly, the thermal barrier fluid carries heat away from the highest-temperature sections of the rotating machine 100, before they can transfer excessive heat to the barrel casing 104. This may avoid potentially damaging conditions for the various seals and/or other temperature-sensitive components of the rotating machine 100.

Figure 3:
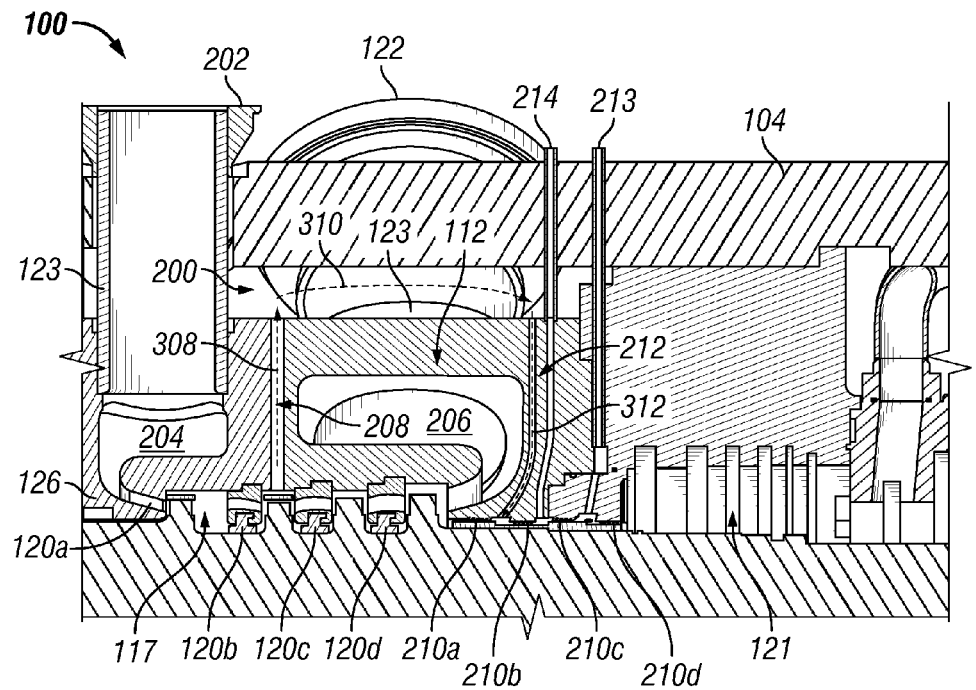
FIG. 3 illustrates an enlarged, partial cross-sectional view of the rotating machine of FIG. 1, according to an embodiment.

FIG. 3 illustrates an enlarged, partial cross-sectional view of the rotating machine 100, according to an exemplary embodiment, showing a half-cross section of the second, lower-temperature internal expansion component 112 and the second component carrier 126. As discussed above, the thermal barrier cavity 200 may be substantially annular, extending around the second component carrier 126; however, in other embodiments, the thermal barrier cavity 200 may extend only partially around and/or may be broken into arcuate segments. Further, the transfer tube 123 of the second inlet 202 and the transfer tube 123 of the second outlet 122 are disposed at least partially in the thermal barrier cavity 200, for example, extending therethrough.

The process flowpath 117 defined in the second internal expansion component 112 extends from the inlet 202 to the outlet 122, and intersects the expansion stages 120 (four are shown: 120a, 120b, 120c, 120d). Further, the process flowpath 117 includes an inlet annulus or volute 204 fluidly coupled to the inlet 202 and an outlet annulus or volute 206 fluidly coupled to the outlet 122. A bleed port 208 extends between and fluidly connects the thermal barrier cavity 200 and the process flowpath 117. For example, the bleed port 208 may extend from a point downstream of the second expansion stage 120b and upstream of the third expansion stage 120c. However, this is only one exemplary location, and the location of the intersection of the bleed port 208 and the process flowpath 117 may be between any of the expansion stages 120a-d, upstream thereof, downstream thereof, or in any other portion of the process flowpath 117 as desired.

The rotating machine 100 may also include a blow down or pressure break-down seal assembly positioned axially between the final expansion stage 120d and the dry gas seal cavity 121. The pressure break-down seal assembly may include one or more non-contacting seals (four are shown: 210a, 210b, 210c, 210d). A return port 212 may be defined in the second internal expansion component 112, extending between and fluidly communicating with the thermal barrier cavity 200 and a point located between seals 210a, 210b. In other embodiments, the return port 212 may extend from the thermal barrier cavity 200 to a point outside of the seals 210a-d.

A low-pressure feed port 214 is also provided and may extend, for example, through the barrel casing 104, the second component carrier 126 to a point between seals 210b, 210c. The low-pressure feed port 214 may be coupled to the low-temperature outlet 122, such that the area between seals 210b, 210c is referenced to the lowest pressure readily available in the rotating machine 100. Further, a seal gas supply port 213 may extend generally parallel to the low-pressure feed port 214 and may communicate with a point between the seals 210c, 210d. The seal gas supply port 213 may be fluidly coupled with a source of seal gas, which may be cleaned, conditioned process fluid, other gases such as hydrogen, or any other suitable seal gas.

Figure 4:
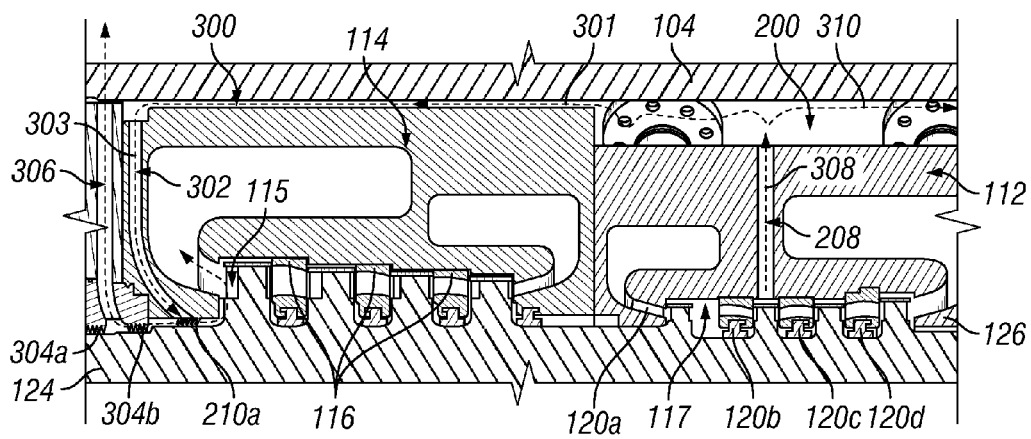
FIG. 4 illustrates another enlarged, partial cross-sectional view of the rotating machine of FIG. 1, according to an embodiment.

FIG. 4 illustrates another enlarged, partial cross-sectional view of the rotating machine 100, according to an exemplary embodiment, showing a half cross-section of the first and second (i.e., higher-temperature and lower-temperature) internal expansion components 110, 112. As described above, the second component carrier 126 includes the bleed port 208 extending from the process flowpath 117 at a point located between the second and third expansion stages 120b,c, for example, to the thermal barrier cavity 200 defined between the second component carrier 126 and the barrel casing 104.

As noted above, the thermal barrier cavity 300 is defined radially between the first component carrier 124 and the barrel casing 104. Further, the thermal barrier cavity 300 may be disposed around the outside of the first component carrier 124 and may fluidly communicate with the thermal barrier cavity 200, as indicated schematically by arrow 301, and with the process flowpath 115 of the first internal expansion component 110 via a return line 302, as indicated schematically by arrow 303. The rotating machine 100 may include a second plurality of pressure break-down or blow down seals 304a,b, with a second low-pressure feed port 306 extending therefrom and being fluidly coupled to the outlet 122 or the outlet 118 (FIG. 2) or both, so as to reference the area between the seals 304a,b to a suitably low pressure so as to protect dry gas seals disposed in the dry gas seal cavity 119 (FIG. 2) from contamination with process fluid and/or excessive pressures associated therewith. Although not shown, additional seals may be provided, such as between the radially-inward point to which the return line 302 extends and the process flowpath 115.

Referring now to FIGS. 3 and 4, operation of the thermal barrier cavities 200, 300 of the rotating machine 100 may be appreciated. The thermal barrier cavity 200, disposed around the lower-temperature component carrier 126, receives a flow of thermal barrier fluid from the bleed port 208. This flow of thermal barrier fluid is bled from the lower-temperature process fluid in the process flowpath 117, as indicated by arrow 308. The process fluid may be bled from a point downstream of the second expansion stage 120b to provide the thermal barrier fluid, and as such, the thermal barrier fluid may be at a temperature below the low-temperature inlet 202, but above the low-temperature outlet 122. The thermal barrier fluid is then introduced in the thermal barrier cavity 200, as indicated by arrow 310, where it interacts with one or both of the transfer tubes 123 of the lower-temperature inlet 202 and outlet 122, transferring heat therewith.

Once circulated into the thermal barrier cavity 200, the flow of thermal barrier fluid splits. A first portion is circulated back, radially-inward, toward the process flowpath 117 of the lower-temperature component carrier 126, as indicated by arrow 312. This first portion of the thermal barrier fluid flows through the return port 212, to the area between the seals 210a,b, where it is again split. The low-pressure feed port 214 is disposed on the other side of the seal 210b from the return port 212 and is referenced to the pressure in the lower-temperature outlet 122; therefore, some of the returning thermal barrier fluid migrates across the seal 210b, where it may join spent seal gas flowing outward through the low-pressure feed port 214. Another portion of the returning thermal barrier fluid migrates across the seal 210a, as it proceeds to, for example, an area downstream of the final expansion stage 120d of the second internal expansion component 112, which is at generally the same pressure as is found in the low-pressure feed port 214.

Referring specifically to FIG. 4, the thermal barrier fluid remaining in the thermal barrier cavity 200 (i.e., the fluid that is not circulated back to the process flowpath 117) flows into the thermal barrier cavity 300 (surrounding the higher-temperature component carrier 124), as indicated by the arrow 301. This thermal barrier fluid may be at a lower temperature than the higher-temperature inlet 114, the higher-temperature outlet 118, the higher-temperature component carrier 124, or a combination thereof, such that the thermal barrier fluid serves as a heat sink for these components. Upon reaching an area proximate the outboard axial extent of the higher-temperature component carrier 124, the thermal barrier fluid reaches the return line 302. Via the return line 302, the thermal fluid is received into either the process flowpath 115, for example, downstream of the expansion stages 116, or into the second low-pressure feed port 306 for combination and removal with spent seal gas, for example.

Accordingly, by supplying a stream of thermal barrier fluid at a manageable temperature through the thermal cavities 200, 300, the thermal barrier fluid acts as a heat sink for the highest-temperature regions (e.g., the higher-temperature inlet 114 and/or the higher-temperature component carrier 124), reducing heat transferred therefrom to the barrel casing 104. As such, the temperature-sensitive components that are in contact with the barrel casing 104, such as seals, are shielded from the high-temperature process fluid. This prevents failure of such components, and may also mitigate component misalignment due to thermal expansion of the various components of the rotating machine 100. One example of conditions at the inlet 114 of the higher-temperature internal expansion component 110 inlet conditions is about 3300 psia and about 850° F. At the inlet 202 of the lower-temperature internal expansion component 112, conditions may be about 3300 psia and about 450° F., for example. Exit pressure for both internal expansion components 110, 112 may be about 890 psia. The thermal barrier cavities 200, 300 may operate at about 1600 psia and about 350° F.

Figure 5:
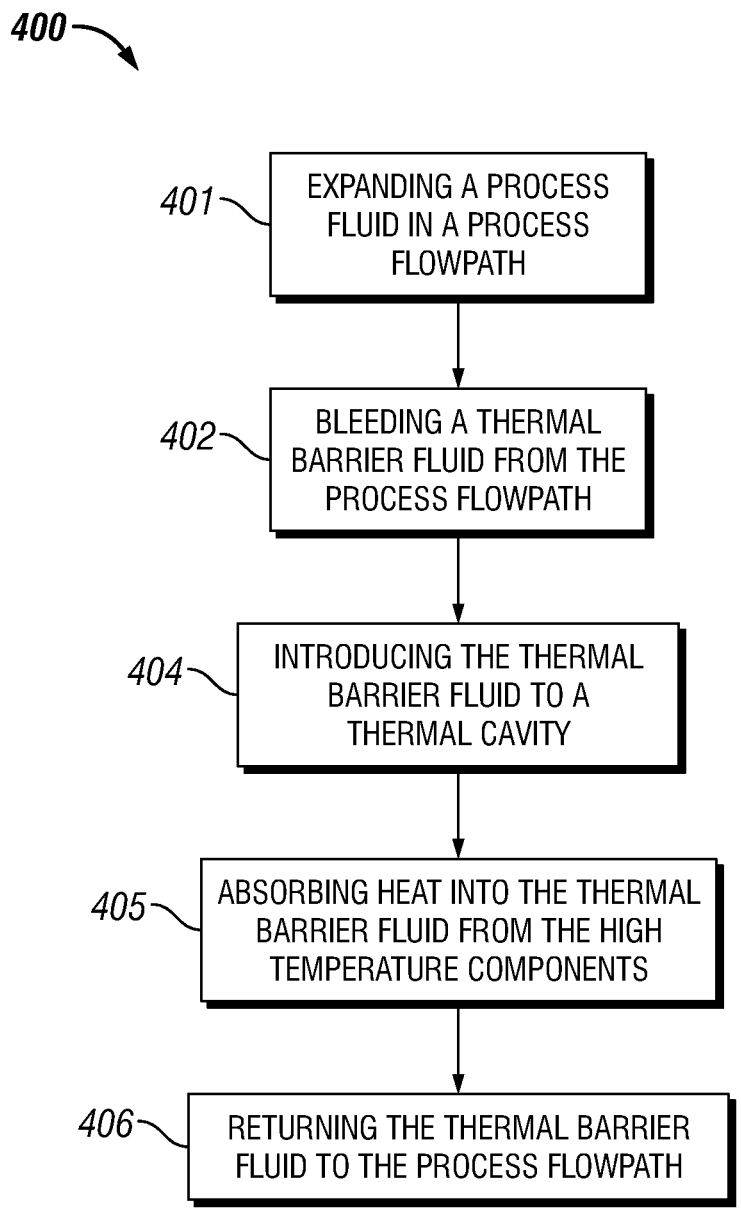
FIG. 5 illustrates a flowchart of an exemplary method for controlling temperature in a rotating machine, according to an embodiment.

FIG. 5 illustrates a flowchart of an exemplary method 400 for controlling temperature in an expander. The method 400 may proceed by operation of one or more embodiments of the rotating machine 100, and thus may best be understood with reference thereto. The method may include expanding a process fluid in a process flowpath, as at 401. The process flowpath may be defined in a lower-temperature component carrier, a higher-temperature component carrier, or both. The method 400 may also include bleeding a thermal barrier fluid from the process flowpath of lower-temperature component carrier, as at 402. The method 400 may also include introducing the thermal barrier fluid to a first thermal barrier cavity defined between the lower-temperature component carrier, as at 404. The thermal barrier fluid in the thermal barrier cavity may serve to protect the outer casing from high temperature components, as at 405. The method 400 may further include returning at least a portion of the thermal barrier fluid to the process flowpath via a return port defined in the lower-temperature component carrier, as at 406.

In another exemplary embodiment, bleeding, as at 402, may include extracting the thermal barrier fluid from the process flowpath at a point downstream from at least one expansion stage defined in the lower-temperature component carrier. Further, returning as at 406 may include returning the at least a portion of the thermal barrier fluid to a second point downstream from the first point.

In an exemplary embodiment, the method 400 may also include introducing at least a portion of the thermal barrier fluid to a second cavity defined between the higher-temperature component carrier and the casing, such that heat is transferred from the higher-temperature component carrier to the thermal barrier fluid. The method 400 may further include directing at least a portion of the thermal barrier fluid from the second cavity to a process flowpath of the higher-temperature component carrier via a second return port defined in the higher-temperature component carrier. The method 400 may further include referencing an area between at least two pressure break-down seals positioned proximal a distal end of the lower-temperature component carrier to a pressure of a lower-temperature outlet fluidly coupled to the process flowpath of the lower-temperature component carrier, and directing a portion of the thermal barrier fluid across at least one of the pressure break-down seals. As such, the method 400 may include allowing the portion of the thermal barrier fluid to mix with a spent seal gas.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. An apparatus for expanding a process fluid, comprising:
   a casing having an inlet and an outlet;
   a component carrier disposed in the casing, the component carrier and the casing defining a cavity therebetween, and the component carrier at least partially defining a process flowpath fluidly communicating with the inlet and the outlet of the casing;
   a rotor disposed at least partially in the component carrier, the rotor at least partially defining a first expansion stage intersecting the process flowpath; and
   a bleed port extending from the process flowpath at a first point of the process flowpath to the cavity, to provide a thermal buffer fluid to the cavity,
   wherein the inlet is coupled to the process flowpath by a first transfer conduit disposed at least partially in the cavity, such that the first transfer conduit transfers heat to the thermal buffer fluid, and
   wherein the outlet is coupled to the process flowpath by a second transfer conduit disposed at least partially in the cavity, such that the second transfer conduit transfers heat to the thermal buffer fluid.

2. The apparatus of claim 1, further comprising a return port extending from the cavity to a second point of the process flowpath, the second point being downstream from the first point, to return at least a portion of the thermal buffer fluid to the process flowpath.

3. The apparatus of claim 2, further comprising:
   first and second pressure break-down seals configured to at least partially seal the component carrier and a shaft; and
   a low-pressure feed port extending at least partially through the component carrier and to a point between the first and second pressure break-down seals, wherein at least a portion of the thermal buffer fluid in the return port flows across the first pressure break-down seal to the low-pressure feed port.

4. The apparatus of claim 1, wherein the cavity forms at least part of an annulus extending at least partially around the component carrier.

5. The apparatus of claim 1, wherein the rotor at least partially defines a second expansion stage intersecting the process flowpath, the first point being between the first and second expansion stages.

6. A rotating machine, comprising:
   a casing having a higher-temperature inlet, a higher-temperature outlet, a lower-temperature inlet, and a lower-temperature outlet;
   a lower-temperature component carrier disposed in the casing, including a first expansion stage, and defining a first process flowpath intersecting the first expansion stage, wherein the first process flowpath is fluidly coupled to the lower-temperature inlet and the lower-temperature outlet, and wherein the lower temperature component carrier and the casing define a first cavity radially therebetween;
   a higher-temperature component carrier disposed in the casing and co-axially aligned with the lower-temperature component carrier, the higher-temperature component carrier including a second expansion stage and defining a second process flowpath intersecting the second expansion stage, wherein the second process flowpath is fluidly coupled to the higher-temperature inlet and the higher-temperature outlet, the higher temperature component carrier and the casing defining a second cavity radially therebetween, the second cavity being in fluid communication with the first cavity; and
   a bleed port extending in the lower-temperature component carrier and fluidly communicating with the first process flowpath at a first point of the first process flowpath and with the first cavity, to provide a thermal barrier fluid from the first process flowpath to the second cavity.

7. The rotating machine of claim 6, wherein the second cavity is configured to receive thermal barrier fluid from the first cavity.

8. The rotating machine of claim 6, further comprising a first return port extending from the first cavity to the first process flowpath, the first return port being configured to direct fluid from the first cavity to the first process flowpath at a second point located downstream from the first point.

9. The rotating machine of claim 8, wherein at least a portion of the thermal barrier fluid directed through the first return port migrates across a pressure break-down seal and combines with a spent seal gas flow.

10. The rotating machine of claim 8, further comprising a second return port extending from the second cavity to the second process flowpath, the second return port being configured to direct thermal barrier fluid from the second cavity to the second process flowpath.

11. The rotating machine of claim 10, wherein at least one of the lower-temperature outlet and the lower-temperature inlet is disposed at least partially in the first cavity.

12. The rotating machine of claim 11, wherein at least one of the higher-temperature inlet and the higher-temperature outlet is disposed at least partially in the second cavity.

13. The rotating machine of claim 6, wherein the first point is located downstream from the first expansion stage and upstream from a third expansion stage defined in the lower-temperature component carrier and intersecting the first process flowpath.

14. The rotating machine of claim 6, wherein the thermal barrier fluid is substantially $CO_2$.

15. A method for controlling temperature in a rotating machine, comprising:
   expanding a process fluid in a lower-temperature component carrier and a higher-temperature component carrier;
   bleeding a thermal barrier fluid from a process flowpath of the lower-temperature component carrier;
   introducing the thermal barrier fluid to a first cavity defined between the lower-temperature component carrier and a casing of the rotating machine such that heat transfers from the lower-temperature component carrier, the higher temperature component carrier, or both to the thermal barrier fluid; and
   returning at least a portion of the thermal barrier fluid to the process flowpath via a return port defined in the lower-temperature component carrier.

16. The method of claim 15, further comprising:
   introducing at least a portion of the thermal barrier fluid to a second cavity defined between the higher-temperature component carrier and the casing, such that heat is transferred from the higher-temperature component carrier to the thermal barrier fluid; and
   directing at least a portion of the thermal barrier fluid from the second cavity to a process flowpath of the higher-temperature component carrier via a second return port defined in the higher-temperature component carrier.

17. The method of claim 15, wherein:
   bleeding the thermal barrier fluid comprises extracting the thermal barrier fluid from the process flowpath at a point downstream from at least one expansion stage defined in the lower-temperature component carrier; and
   returning the at least a portion of the thermal barrier fluid to the process flowpath comprises returning the at least a portion of the thermal barrier fluid to a second point downstream from the first point.

18. The method of claim 17, further comprising:
   referencing an area between at least two pressure break-down seals positioned proximal a distal end of the lower-temperature component carrier to a pressure of a lower-temperature outlet fluidly coupled to the process flowpath of the lower-temperature component carrier;
   directing a portion of the thermal barrier fluid across at least one of the pressure break-down seals; and
   allowing the portion of the thermal barrier fluid to mix with a spent seal gas.

* * * * *